United States Patent [19]

Kahkoska

[11] Patent Number: 5,396,582
[45] Date of Patent: Mar. 7, 1995

[54] RASTER TO VECTOR CONVERSION SYSTEM AND METHOD THEREFOR

[75] Inventor: James Kahkoska, Colorado Springs, Colo.

[73] Assignee: Hewlett-Packard Company, Palo Alto, Calif.

[21] Appl. No.: 84,780

[22] Filed: Jun. 28, 1993

Related U.S. Application Data

[63] Continuation of Ser. No. 651,716, Feb. 6, 1991, abandoned.

[51] Int. Cl.$^6$ ............................................. G06F 15/00
[52] U.S. Cl. ................................... 395/103; 395/106
[58] Field of Search ............... 395/106, 103, 115, 114; 382/21, 56; 358/261.3, 261.4, 467

[56] References Cited

U.S. PATENT DOCUMENTS 4,777,651 10/1988 McCann et al. ........................ 382/21

*Primary Examiner*—Arthur G. Evans

[57] ABSTRACT

A system and method for converting raster data in a memory plane to a vector number number such as a plotter. The method with copying the raster data into a working copy and then at a predetermined bit in the memory plane sequentially scans each bit to ascertain the presence of first or second states. The first state corresponds to the illumination of a corresponding pixel in the display monitor and the second state corresponding to a pixel which is not illuminated. When the first state is sensed, all vectors having beginning X,Y coordinates corresponding to the X,Y coordinate of the bit are identified. When more than one vector is identified, only one of the identified vectors is selected according to a priority scheme. All of the bits in the working copy corresponding to the selected vector are erased. The beginning X,Y coordinate and the ending X,Y coordinate of the selected vector form the vector output. All end-to-end contiguous vectors having beginning X,Y coordinates corresponding to the ending X,Y coordinate of the selected vector are then identified. If more than one end-to-end contiguous vector is present, only one vector is selected. This process continues as long as there are end-to-end contiguous vectors. When no more contiguous vectors are detected, the method returns to the next sequential bit to ascertain the state of that bit. This process continues until the entire raster data in the working copy is evaluated.

15 Claims, 7 Drawing Sheets

RASTER TO VECTOR CONVERSION SYSTEM AND METHOD THEREFOR

CROSS REFERENCE TO RELATED APPLICATION

This is a continuation of application Ser. No. 07/651,716, filed on Feb. 6, 1991, now abandoned.

BACKGROUND OF THE INVENTION

1. Field of the Invention

The present invention relates to the conversion of raster data to vector data and, more particularly, the present invention relates to the conversion of oscilloscope raster display data into vector data for driving a vector output device such as a plotter.

2. Statement of the Problem

Raster displays are commonly used for video monitors. The storage of raster display information is done in a cartesian coordinate (X,Y) two dimensional memory array referred to generally as a memory plane or bit map. Each pixel in the display monitor is represented by a bit of information in the memory plane. If the bit in the memory plane is a 1, then the corresponding pixel in the display monitor is fully illuminated. If the bit in the memory plane is a 0, then the corresponding pixel in the display monitor is not illuminated. A hard copy of the raster display occurring in a monitor can be obtained from a raster printer. Again, each bit in the memory plane provides a corresponding "dot" or "no dot" in the raster printer.

It is desirable to use a vector plotter to provide hard copies of the raster display in the monitor. For example, oscilloscopes generally have raster displays upon which the waveforms being measured are viewed. It is desirable to functionally interconnect such oscilloscopes with vector plotters. However, fundamental differences exist between raster and vector data representations. A vector (or line) is represented by vector beginning and end points. Each vector beginning and end point corresponds to an X,Y coordinate in the cartesian coordinate system. The vector is then represented by the two points and the plotter draws a line from the beginning point to the end point. Due to such fundamental differences between raster and vector data representation, it is difficult to reproduce an accurate representation of a raster display on a vector device such as a plotter.

In FIG. 1, one prior solution to the problem of converting raster data to vector output is illustrated. Base data 100 is created, such as by an oscilloscope generating sampled waveforms from a device or system under test. The generation of base data 100 is well known in the art. The base data 100 is accessed by a set of raster draw routines 110 which delivers the raster data to a raster memory plane 120. The raster draw routines 110 provide the necessary indicators, the necessary configurations and statuses, the markers, the graticules, and of course the waveforms being sampled into the raster memory plane 120 for display in a raster display 130. The binary bit appearing in the raster memory plane 120, as discussed above, has a corresponding pixel in the raster display 130. When it is desired to connect a vector plotter 140, a separate set of vector draw routines 150 must be created in software to provide the indicators, configurations and statuses, markers, graticules and the sampled waveforms. The provision of separate vector draw routines 150 is expensive in that it requires an initial overhead at a product's inception to create the separate set of routines 150. When vector draw routines are specifically created for one product, they do not have portability among other products using raster displays. Additionally, once the product is introduced and supported to the customer base, the addition of new markers and indicators in the display requires the creation of new corresponding software to the vector draw routines 150. Hence, such routines 150 must be continually supported. Finally, such vector draw routines do not accurately reproduce the pattern on the display.

A need therefore exists for providing raster to vector conversion without requiring the creation of separate vector draw routines 150. Such a solution should not require additional overhead at the inception of each different product nor should it require downstream support. The conversion should be completely portable from product to product and, yet, should provide high quality conversion so that the vector output corresponds one for one with the raster display.

RESULTS OF THE PATENTABILITY SEARCH

A patentability search was made on raster to vector conversion systems and methods.

U.S. Pat. No. 4,777,651 issued to McCann, et al. pertains to a method of pixel to vector conversion in an automatic picture coding system. This patent sets forth a method for converting the bit map image of the picture to vectors as the picture is being raster scanned. The bit map is delayed as it is being generated in order to form a series of tessellations or windows of data. The raster to vector conversion occurs in real time. The windows are analyzed by neighborhood-logic elements which generate a bit stream output defining only line and edge features of the original picture. The line and edge features from each window are chain coded and temporarily stored, as acquired, in corresponding lists so as to link the line and edge features together. When the storage of each chain-coded segment is completed, the segments are converted to vectors and transmitted to the vector plotter. In the preferred embodiment of the '651 patent, the window is preferably a six pixel by six pixel window. The configuration of the pixels in the window corresponds to one of eight class designations. The '651 approach provides a solution to the above problem by providing a real time solution. The approach, however, requires the use of windows to analyze the raster bit map, and, since only a portion of the bit map is being analyzed at a given time, it also requires linking of lists from the data generated from each window.

Hence, a further need exists to provide a real time solution to the above problem which analyzes the raster bit map data in a vector fashion without the use of tessellations or windows as found in the '651 patent.

SOLUTION TO THE PROBLEM

The present invention provides a solution to the problem with a real time system and method that generates vector information directly from the raster data in the memory plane without using tessellations or windows. Furthermore, the present invention is fully portable and does not require separate draw routines for each different product. Finally, the present invention provides exact reproduction of the raster display into a vector plotter.

SUMMARY OF THE INVENTION

A system and method for converting raster data in a memory plane to a vector output in order to drive a vector device such as a plotter is set forth. The system and method of the present invention starts at a predetermined bit in a working copy of the memory plane and sequentially scans each bit in the copy to ascertain the presence of a first state or of a second state. The first state corresponds to the illumination of a corresponding pixel in the display monitor (i.e., a bit equal to one), while in the second state the corresponding pixel is not illuminated (i.e., bit equals zero). When the second state (pixel unlit) is detected for a bit, the next sequential bit in the working copy is scanned and analyzed. In response to sensing the first state, the system and method of the present invention identifies all vectors having beginning X,Y coordinates corresponding to the X,Y coordinate of the scanned bit. When more than one vector is identified, only one of the identified vectors is selected according to a priority scheme. The priority scheme selects horizontal and vertical vectors over diagonal vectors, it then selects the longest vector. In the case of equal length horizontal and vertical vectors, horizontal vectors are selected.

Upon selection of one vector, all of the bits in the copy of the memory plane corresponding to that vector are erased (i.e., changed from the one state to the zero state). The beginning X,Y coordinate and the ending X,Y coordinate of the selected vector is then outputted to the vector plotter and a line is drawn between the beginning and ending coordinates. The system and method of the present invention then identifies all vectors having beginning X,Y coordinates corresponding to the ending X,Y coordinate of the selected vector. In other words, a determination is made as to whether or not a vector contiguous to the first selected vector is present. Again, if more than one vector is present at the ending X,Y coordinates of the first selected vector, only one vector is selected according to the same priority scheme. This process continues as long as there are contiguous vectors that form a series or chain of vectors. When no more contiguous vectors are detected, the method and system of the present invention returns to the next sequential bit in the scan to ascertain the state of that bit. This process continues until the entire memory plane is evaluated.

DETAILED SPECIFICATION

1. General Discussion

Figure 1:
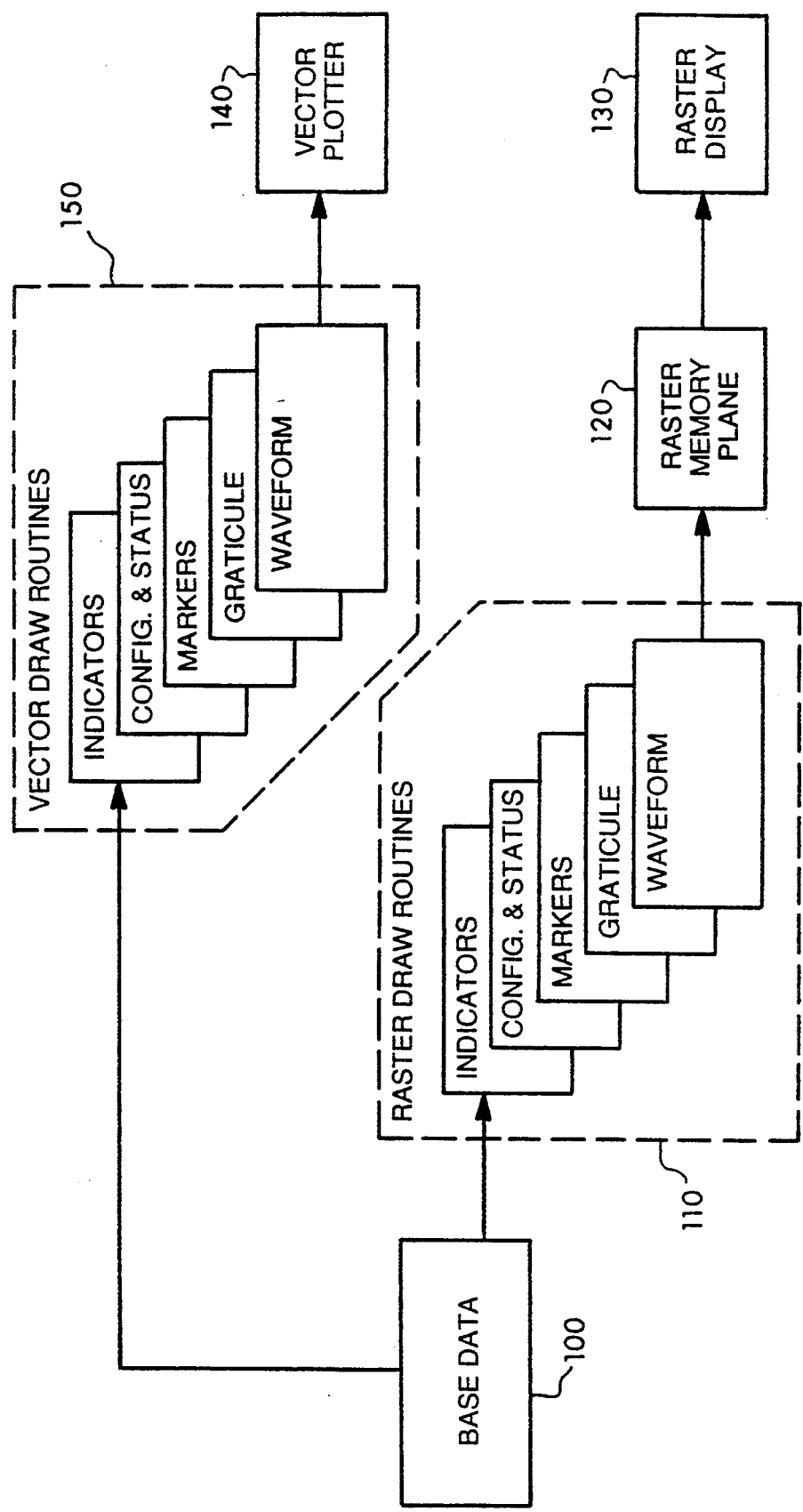
FIG. 1 is a block diagram setting forth the prior art approach of raster to vector conversion using specific vector draw routines.
Figure 2:
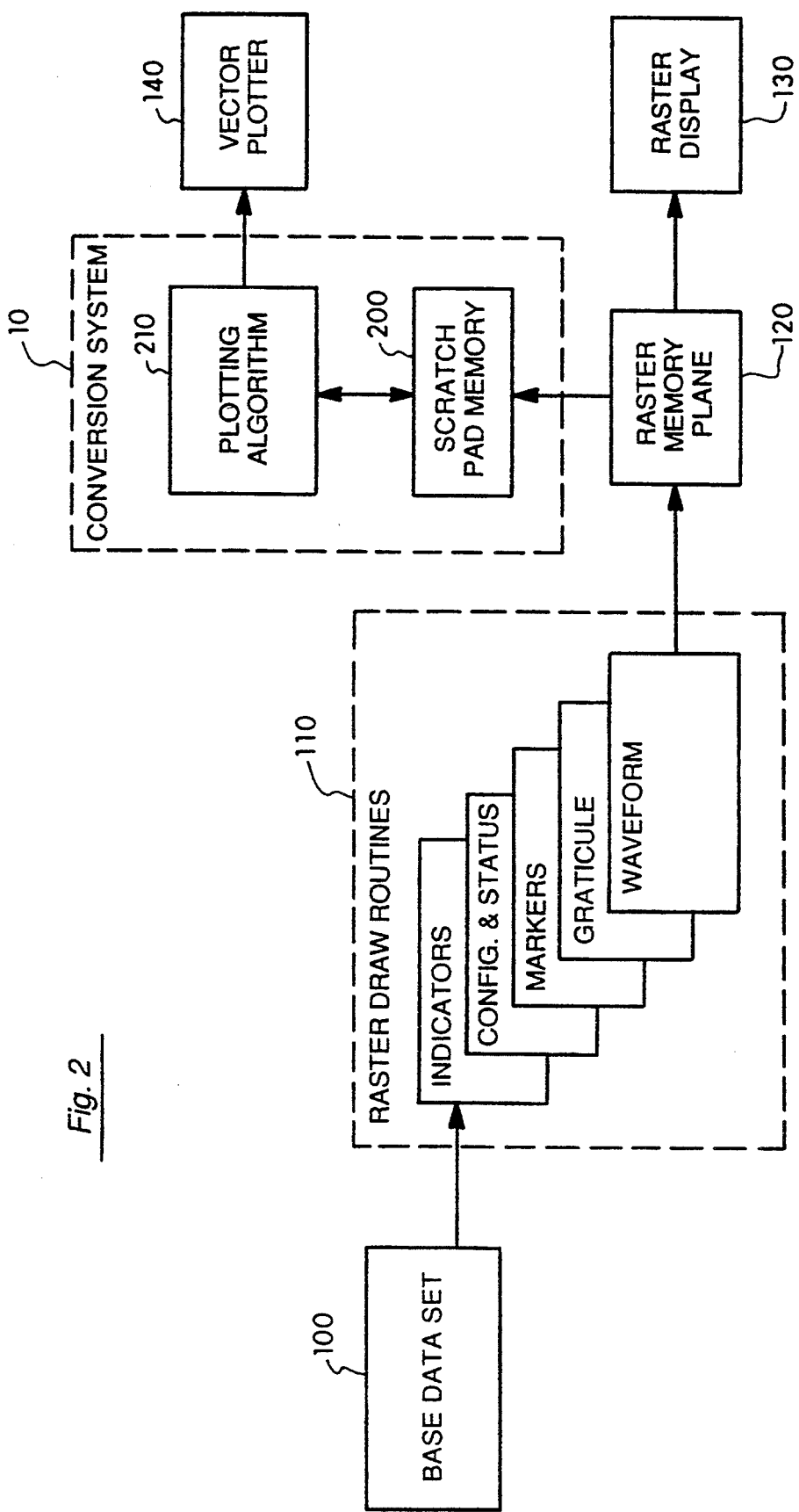
FIG. 2 is a general block diagram setting forth the raster to vector conversion system of the present invention.

In FIG. 2, the system 10 of the present invention is shown to include a scratch pad memory 200 and the plotting algorithm 210. Where possible, the prior art system of FIG. 1 with its corresponding referenced numerals and components are utilized in FIG. 2.

Hence, as shown in FIG. 2, the base data set 100 is interconnected with the raster draw routines 110 to draw the desired set of waveform data and graphical information into the raster memory plane 120 for display in a raster display 130. Under the teachings of the present invention, however, the output from the raster memory plane 120 is also delivered into a conversion system 10 containing a scratch pad memory 200 and plotting algorithm 210. The scratch pad memory 200 is a bit for bit replica of the memory plane 120 and the raster data contained therein. The plotting algorithm 210 which can be contained, for example, in a microprocessor, accesses the information contained in the scratch pad memory, as will be explained subsequently, to generate the necessary vector coordinates to drive a vector plotter 140.

2. System Operation

The system operates as follows. Every pixel in the raster memory plane is on (i.e., binary 1) or off (i.e., binary 0) dependent upon the information drawn therein by the raster draw routines 110. At the start of the conversion process, the entire contents of the raster memory plane 120 are copied into the scratch pad memory 200. The plotting algorithm 210 operates on the information in the scratch pad memory in the manner discussed in the following examples.

EXAMPLE 1

Selection of a Vector From Beginning Pixel Location

Figure 3:
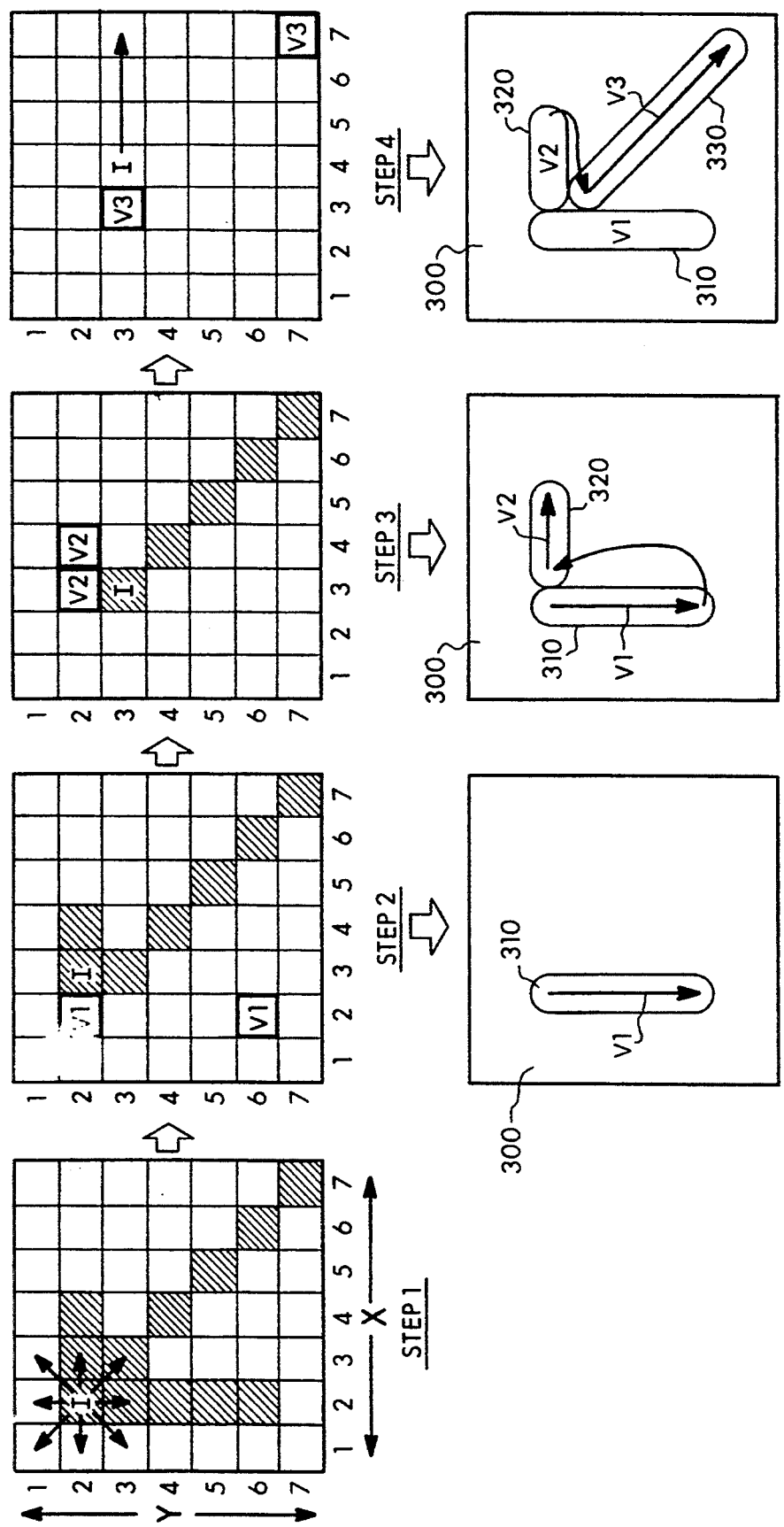
FIG. 3 sets forth an illustration of the plotting algorithm of the present invention processing and identifying three separate vectors.

FIG. 3 depicts a hypothetical screen display containing seven pixels in the X direction and seven pixels in the Y direction; also shown is the paper 300 on which the plotter draws the vectors. It is to be expressly understood that the example of FIG. 3 is for purposes of illustration and that any sized memory plane (or scratch pad memory) could be utilized.

The present invention initially starts its processing at the X,Y coordinate of 1,1. At coordinate 1,1, the pixel is off. Indeed, the entire Y=1 row of coordinates is off and the algorithm of the present invention quickly scans each pixel sequentially (i.e., 1,1; 2,1; 3,1; . . . 7,1; 1,2) and ascertains that the corresponding pixels are not lit.

However, at coordinate 2,2 interrogation I occurs since this is the first bit in the example corresponding to a lit pixel. At this X,Y location, the plotting algorithm 210 systematically looks for other vectors in each of the eight directions from the pixel. These are shown by the arrows emanating from the pixel at 2,2 of step 1 of FIG. 3. The plotting algorithm 210 after analyzing the eight directions ascertains that there are three possible vectors, and that each of these vectors has a beginning coordinate corresponding to the bit being interrogated. The first vector is a horizontal vector three pixels long starting at 2,2 and ending at 4,2. The second vector is a diagonal vector six pixels long starting at 2,2 and ending at 7,7. The third vector is a vertical vector five pixels long starting at 2,2 and ending at 2,6.

The plotting algorithm 210 uses a priority scheme as to which vector to select. In the preferred embodiment, horizontal and vertical vectors have priority over diagonal vectors. This priority enhances the appearance of the plotter output by minimizing diagonal vectors. Hence, the algorithm 210 always selects a horizontal or vertical vector before selecting a diagonal vector.

Secondly, the plotting algorithm 210, in the preferred embodiment, selects the longest horizontal or vertical vector to draw first. At step 1, the vertical vector is selected. Hence, the first selected vector V1 has beginning and ending coordinates of 2,2 and 2,6. This is indicated in step 2 and the first vector V1 selected is removed from the scratch pad memory 200 as shown in step 2. This occurs by setting all the bits in vector V1 to zero. The beginning and ending X,Y coordinates are recorded and the vector plotter is instructed to place the pen at 2,2 and to draw a line to 2,6 (310).

The plotting algorithm 210 continues its evaluation at coordinate 2,6 and looks in the eight directions at that coordinate. However, it does not find any adjacent pixels and, therefore, the algorithm returns to the next sequential pixel where it left off from the initial scan which places the next point of interrogation at coordinates 3,2 as shown by I in step 2.

At coordinate 3,2, the plotting algorithm 210 interrogates the eight directions and finds two vectors. The first vector is a horizontal vector having a length of two pixels starting at coordinate 3,2 and ending at coordinate 4,2. The second vector is a vertical vector having a length of two pixels starting at coordinate 3,2 and ending at 3,3. Both vectors are of equal length and under the teachings of the present invention, the plotting algorithm 210, in the preferred embodiment, selects the horizontal vector over the vertical vector. Equal length vectors are selected in the following order: right, left, up, down, upright, downright, downleft, and upleft. As shown in step 3, the beginning and ending points (or coordinates) of vector, V2, are 3,2 and 4,2. The pen of the plotter is instructed to lift from coordinate 2,6 and travel to 3,2 where it draws vector V2 (320). The bits for vector V2 are removed from the scratch pad memory 200.

The algorithm 210 ends at 4,2 (which happens to correspond to the next sequential pixel), looks in eight directions and finds no other vectors. In fact all of the remaining bits in the Y=2 row correspond to pixels which are not lit. The scanning algorithm continues until it reaches coordinate 3,3 in which another bit corresponding to a lit pixel is found. Again, the eight directions are interrogated and only one diagonal vector V3 is discovered. In step 4 the diagonal vector V3 having beginning and ending coordinates of 3,3 and 7,7 is recorded. The pen of the plotter is instructed to lift from coordinate 4,2 and to travel to 3,3 to draw the diagonal vector V3 from 3,3 to 7,7 (320). The bits for vector V3 are removed from the scratch pad memory 200.

The scanning algorithm continues (i.e., as shown by I in step 4) throughout the remaining display until it reaches coordinate 7,7 at which time the analysis stage is complete. No other bits corresponding to lit pixels are found. The three separate vectors V1, V2, and V3 have been discovered and drawn.

Several observations pertaining to the characteristics of the .plotting algorithm 210 of the present invention can be made with respect to FIG. 3. First, the plotting algorithm interrogates each bit in the working copy pixel in a sequential fashion starting in a selected corner of the raster and proceeding pixel by pixel and row by row through the working copy of the memory plane 120. The present invention is not limited to starting in the upper left hand corner and proceeding to analyze each sequential bit in a row before going to the next row. The starting point could be any suitable starting point in the raster and it could proceed row by row, column by column, or according to any suitable predetermined pattern so long as all bits are analyzed.

Second, once a bit corresponding to a lit pixel is encountered, the algorithm looks in all eight directions from that bit in the working copy in order to determine the existence of any vectors. The algorithm then selects any discovered vectors and it selects the longest horizontal or vertical vectors, giving these vectors priority over the diagonal vectors. Again, it is to be expressly understood that under the teachings of the present invention, any type of priority scheme could be selectably used. For example, the priority scheme could select the longest vector regardless of whether it is vertical, horizontal, or diagonal. After selection of a vector, the beginning and ending coordinates for the selected vector are recorded and the vector plotter 140 can actually draw that vector in real time or the coordinates can be stored for later plotting. The vector output could be used on any suitable vector devices or equipment.

Third, all of the bits in the selected vector are removed from the scratch pad memory 200. This eliminates all of the bits in a selected vector from further evaluation.

Fourth, after drawing a vector, the point of scanning continues with the ending coordinate of the selected vector. If there are no detected vectors in any of the eight directions from the ending coordinate of the selected vector, then the plotting algorithm 210 returns to the next sequential bit in the working copy. Again, it is to be expressly understood that under the teachings of the present invention, rather than continuing the scanning at the ending coordinate of the selected vector, scanning could resume at the next sequential point. However, as will be shown in FIG. 4, by continuing scanning at the end point of the selected vector, greater efficiency is achieved.

EXAMPLE 2

Detection of an End-To-End Contiguous Series of Vectors

Figure 4:
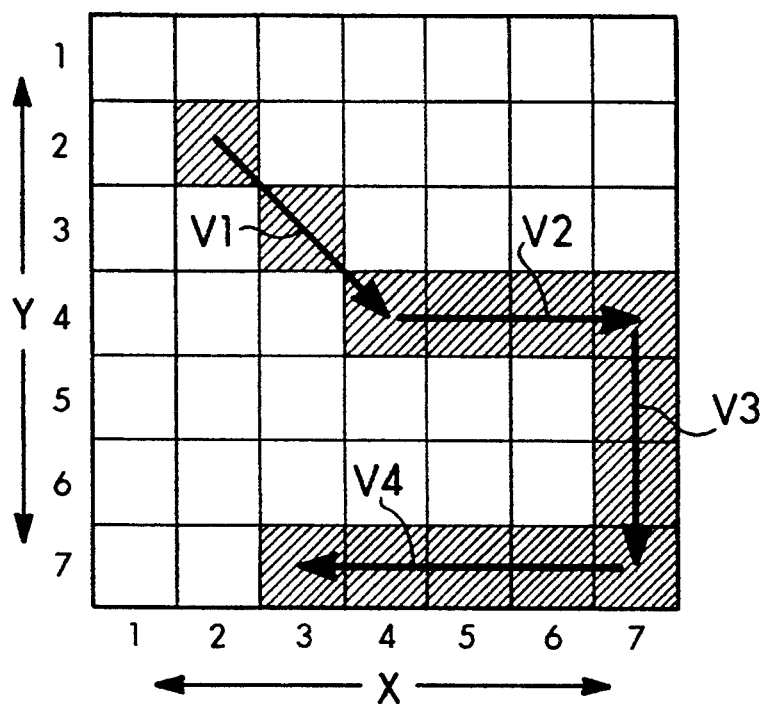
FIG. 4 is an illustration of the plotting algorithm of the present invention processing a series of four contiguous vectors.

In FIG. 4, another example of the operation of the plotting algorithm 210 is set forth. In FIG. 4, the scanning algorithm starts at coordinates 1,1 and quickly and sequentially evaluates the bits in the working copy in row Y1 and coordinate 1,2 since no bits correspond to lit pixels. At coordinate 2,2, vector V1 is discovered and its beginning and ending coordinates recorded. Vector V1 is plotted with the pen of the plotter stopping at 4,4. Scanning by the algorithm continues from the end point of V1 (i.e., 4,4) by looking for end-to-end contiguous vectors in the eight directions. Vector V2 is discovered. Vector V2 has beginning and ending coordinates of 4,4 and 7,4. Its bits are removed from the scratch pad memory 200. Vector V2 is plotted, the pen traveling from 4,4 to 7,4. The scanning by the algorithm continues at the ending coordinate of vector V2 (i.e., 7,4) by looking for vectors in the eight directions. Vector V3 is discovered. The beginning and ending coordinates of vector V3 are recorded and the bits in vector V3 are removed from the scratch pad memory. Vector V3 is plotted, the pen traveling from 7,4 to 7,7. Scanning resumes at the end point of vector V3 (i.e., 7,7) by looking for vectors in the eight directions. Vector V4 is uncovered and the beginning and ending coordinates are recorded. The bits in vector V4 are removed from the scratch pad memory. Scanning continues by looking for vectors in the eight directions at the ending coordinate of vector V4 (i.e., at 3,7). However, no additional vectors are discovered and sequential scanning continues at coordinate 3,2. The scanning proceeds bit by bit, row by row (i.e., row 2, 3, 4, 5, 6 and 7), and, since all vectors have already been removed, no other bits corresponding to lit pixels are discovered and the scanning is complete.

Hence, in the example of FIG. 4, four end-to-end contiguous vectors were uncovered and were plotted. It can be quickly observed that all four vectors were rapidly evaluated and removed from the scratch pad memory. This results in a high degree of efficiency since the pen on the vector plotter remained on the paper and drew all four discovered vectors without lifting from the paper.

EXAMPLE 3

Processing of Combined Individual and Series Vectors

Figure 5:
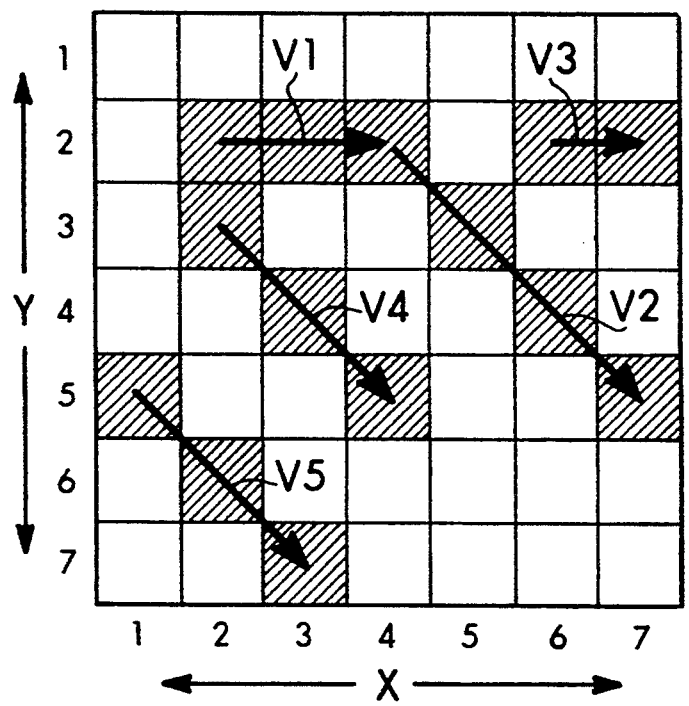
FIG. 5 is an illustration setting forth the operation of the plotting algorithm of the present invention identifying a combination of separate vectors and a series of contiguous vectors.

In FIG. 5, another example of the operation of the present invention is set forth. Again, scanning starts at coordinates 1,1 and the algorithm 210 quickly evaluates the bits in row Y=1. However, at coordinate 2,2, the first bit corresponding to a lit pixel is encountered. The eight directions are analyzed and two vectors are discovered (i.e., a horizontal vector 3 bits long and a vertical vector 2 bits long). The horizontal vector is selected (i.e., priority based upon length) and is shown as V1 in FIG. 5. The beginning and ending coordinates are recorded and the bits of vector V1 are erased in the scratch pad memory. The vector V1 is drawn. The scan continues at coordinates 4,2 (by looking in the eight directions) and diagonal vector V2 is discovered. The beginning and ending coordinates are noted and vector V2 is plotted and erased from scratch pad memory. The series of vectors V1 and V2 have been detected and plotted. The scan continues at coordinates 7,5 and no other adjacent or neighboring bit in the first state is found. The series is ended. Therefore, the scan returns to the next successive coordinates of 3,2. The algorithm quickly commences bit by bit to coordinates 6,2 and discovers a single horizontal vector V3. Bits in vector V3 are erased from the scratch pad memory. The pen on the plotter lifts from 7,5 and travels to 6,2 to draw vector V3. The scan continues at the ending coordinates (7,2) of V3. However, no vectors in any of the eight directions are sensed and the next sequential scan is at coordinates 1,3. Again, no vector is sensed and the scan progresses to coordinate 2,3. Vector V4 is sensed, the beginning and ending points recorded and the bits in vector V4 erased from the scratch pad memory. The pen on the plotter lifts from 7,2 and travels to 2,3 to draw vector V4. The scan continues at coordinates 4,5 by looking for vectors in eight directions. However, no vectors are sensed and the scan returns to the next sequential scan at 3,3. The scan continues for the remaining row Y3 and no vectors are sensed. It then proceeds through row Y4 with no vectors being sensed. However, at coordinates 1,5 vector V5 is sensed, plotted, and erased from scratch pad memory. The pen on the plotter lifts from coordinates 4,5 and travels to 1,5 to draw vector V5. All vectors in FIG. 5, at this point, are detected and drawn. The scan, however, progresses in the fashion described above scanning each successive bit until reaching coordinates 7,7.

EXAMPLE 4

Processing of Scales/Graticules

Figure 6:
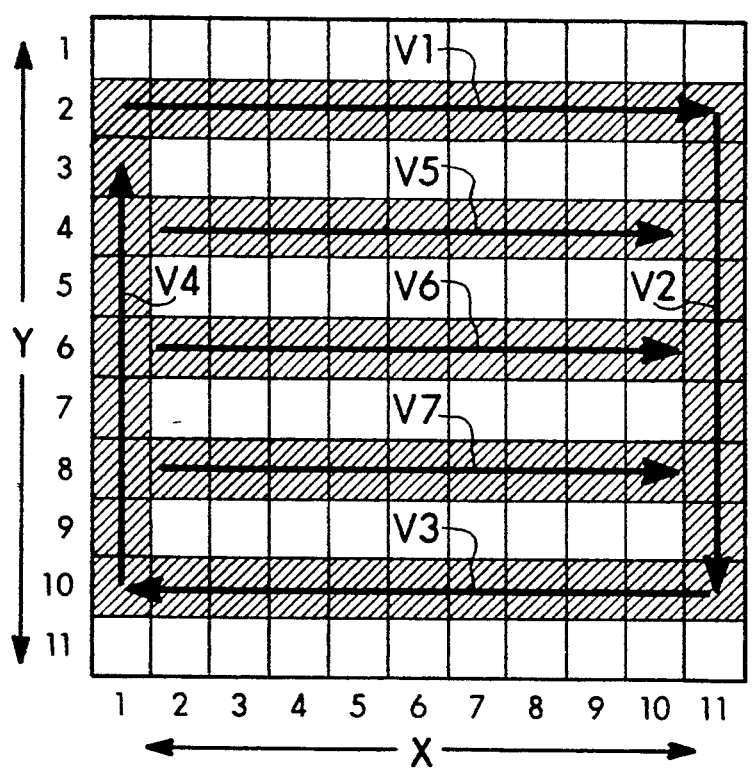
FIG. 6 is an illustration of the operation of the plotting algorithm of the present invention processing a set of scales or graticules.

FIG. 6 shows the efficiency of the present invention in dealing with horizontal and vertical lines such as those found in the scales or graticules of an oscilloscope display. In the example of FIG. 6, a bit plane of eleven bits square is shown. It is to be expressly understood that this is for purposes of an example and that the present invention is not limited to the number of bits within a memory plane. The plotting algorithm 210 commences its scan at 1,1 and finds no bits in the first state in row Y1. However, at coordinates 1,2, a horizontal vector V1 and a vertical vector V4 are detected. The horizontal vector V1 is eleven bits long whereas the vertical vector V4 is nine bits long. The horizontal vector V1 is selected (based upon priority), deleted from the scratch pad memory and has its beginning and ending coordinates recorded and drawn. The scan commences at coordinates 11,2 and only one vertical vector V2 is sensed. The vertical vector V2 is recorded and drawn, the bits in the vector are erased from the scratch pad memory, and the scan commences at coordinates 11,10. Vector V3 is processed followed by vector V4. It can be readily observed that a large number of pixels have been rapidly detected and converted into corresponding drawn vectors. The next scan commences at the end point of vector V4 (i.e., 1,3) senses no contiguous vectors. Therefore, the scan commences at coordinates 2,2. At this time, rows Y2 and Y3 are quickly scanned since there are no lit pixels in these two rows (i.e., vectors V1, V2, V3 and V4 are erased). However, at coordinates 2,4, vector V5 is sensed, drawn, and deleted from memory. Scanning continues at the end point of vector V5 (10,4). However, since no vector is detected, scanning commences at coordinates 3,4 and quickly proceeds to coordinates 2,6 which is the beginning point of vector V6. Vector V6 and vector V7 are similarly processed in the same fashion as vector V5.

This example illustrates the efficiency of the present invention in drawing vectors on the vector plotter. In FIG. 6, the pen engages the paper at 1,2 and draws the entire end-to-end contiguous series of vectors V1 through V4. Next, the pen then lifts from 1,3 and moves to 2,4 to draw vector V5. The pen lifts from 10,4 and travels to 2,6 to draw vector V6. Finally, the pen lifts from 10,6 and travels to 2,8 to draw vector V7.

From the above four examples, it is clear that the plotting algorithm 210 of the present invention provides an exact duplication of the raster display, pixel by pixel, rather than an approximation created by a new set of drawing routines as found in the prior art. The plotting algorithm 210 of the present invention operates on the memory plane or bit map which corresponds to the pixels being illuminated in the display. Hence, the conversion system of the present invention is easily ported between equipment fully independent of how the base data step is generated or what it contains. Because the plotting algorithm 210 of the present invention operates on the bit map or raster memory plane, any and all software or programming errors inherent in the prior art approach of separate drawing routines is eliminated. As will be explained in FIG. 7, the plotting algorithm 210 of the present invention also allows for the efficient processing of field areas such as filled-in polygons or icons.

EXAMPLE 5

Processing of Filled-in Polygons and Icons

Figure 7:
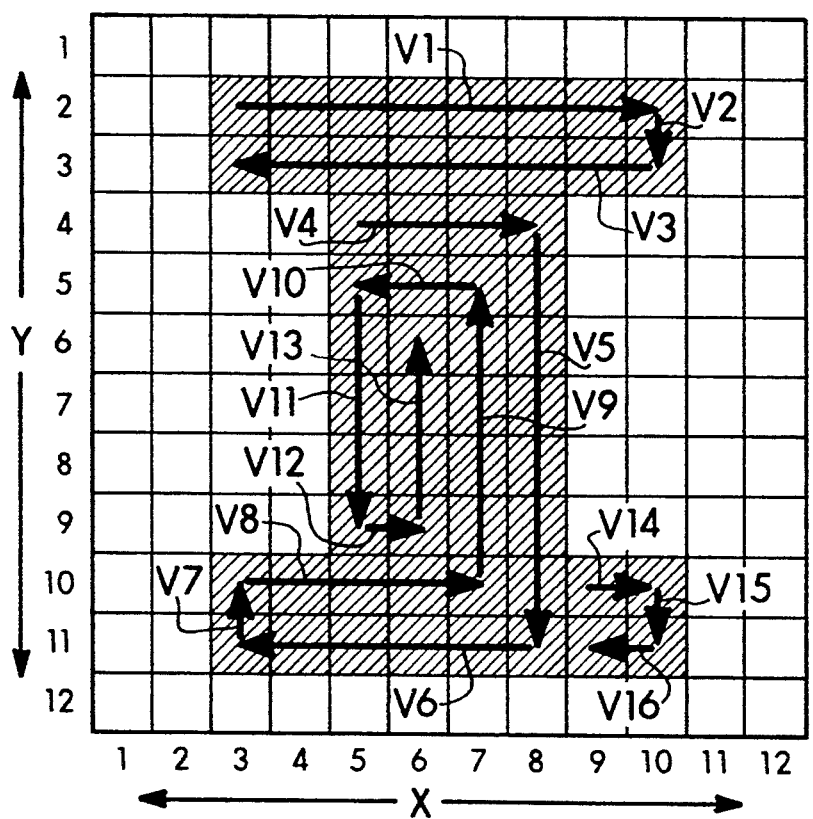
FIG. 7 an illustration of the plotting algorithm of the present invention processing a filled polygon such as the icon I.

In FIG. 7, the filled-in polygon "I" (corresponding to an icon) is illustrated. It is composed of 56 bits in the first state corresponding to illuminated pixels. The plotting algorithm 210 of the present invention in the sequence illustrated correctly plots 15 vectors to exactly reconstruct the icon. In the scanning process, vector 1 is contiguous to vector 2 which is contiguous to vector 3. The series of vectors V1, V2, and V3 are first drawn by the pen. Scanning then detects the next series of vectors; V4 through V13 form this second set of contiguous vectors. The second series is then drawn. Finally, the third series of vectors V14 through V16 is recorded and drawn.

EXAMPLE 6

Processing of Closed Loops

Figure 8:
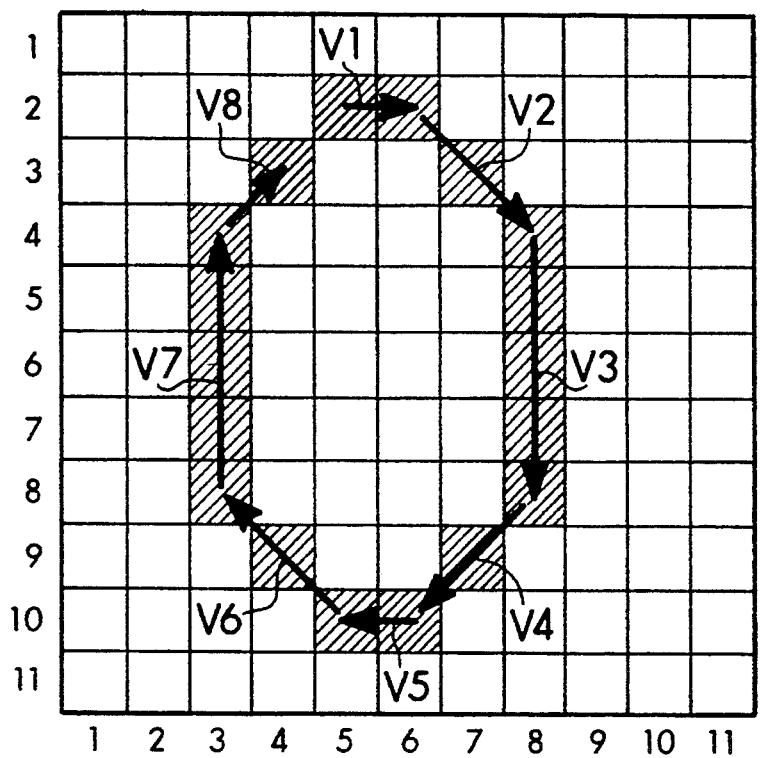
FIG. 8 sets forth an illustration of a plotting algorithm of the present invention closing an open loop in a closed figure such as a "0"
Figure 8:
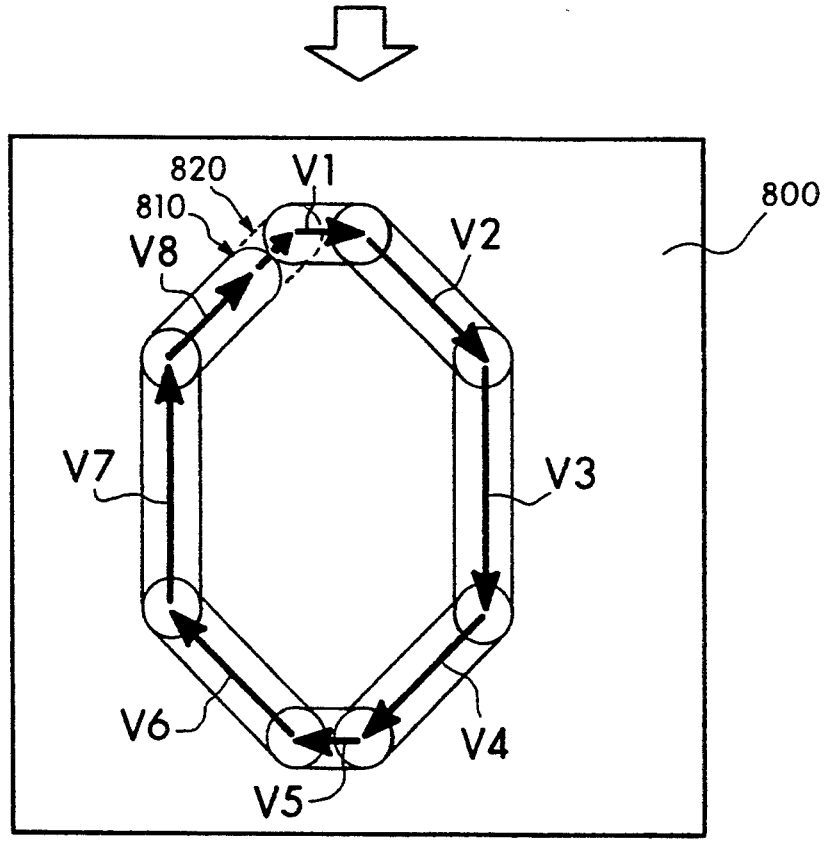

In FIG. 8, the closed loop feature of the present invention is illustrated. In FIG. 8, the pixel representation for a "0" is illustrated. The series of vectors V1 through V8 is detected and drawn. In FIG. 8, however, notice that vector V8 terminates at 4,3 and the pen on the plotter draws to that coordinate. This may leave the appearance of an opening in the "0." This is illustrated by the continuous drawing of the end-to-end contiguous series of vectors V1–V8 on paper 800. The pen stops at 810 and the appearance of an opening is at 820.

Under the teachings of the present invention, while the pen is still down 810 at coordinate 4,3, the plotting algorithm 210 ascertains whether or not the pen is within one pixel of where it started the series of vectors. Since the series of vectors illustrated are vectors V1 through V8, the algorithm ascertains that it is within one pixel (i.e., pixel 5,2) of the start of vector V1. In that event, the plotting algorithm causes the pen to continue drawing into coordinate 5,2 so as to complete or close the loop so as to avoid an opening as shown by the dotted lines 820. FIG. 8 is also an excellent example of fully vector plotting an entire graphic symbol without the pen in the plotter leaving the page.

3. Operation of Method

Figure 9:
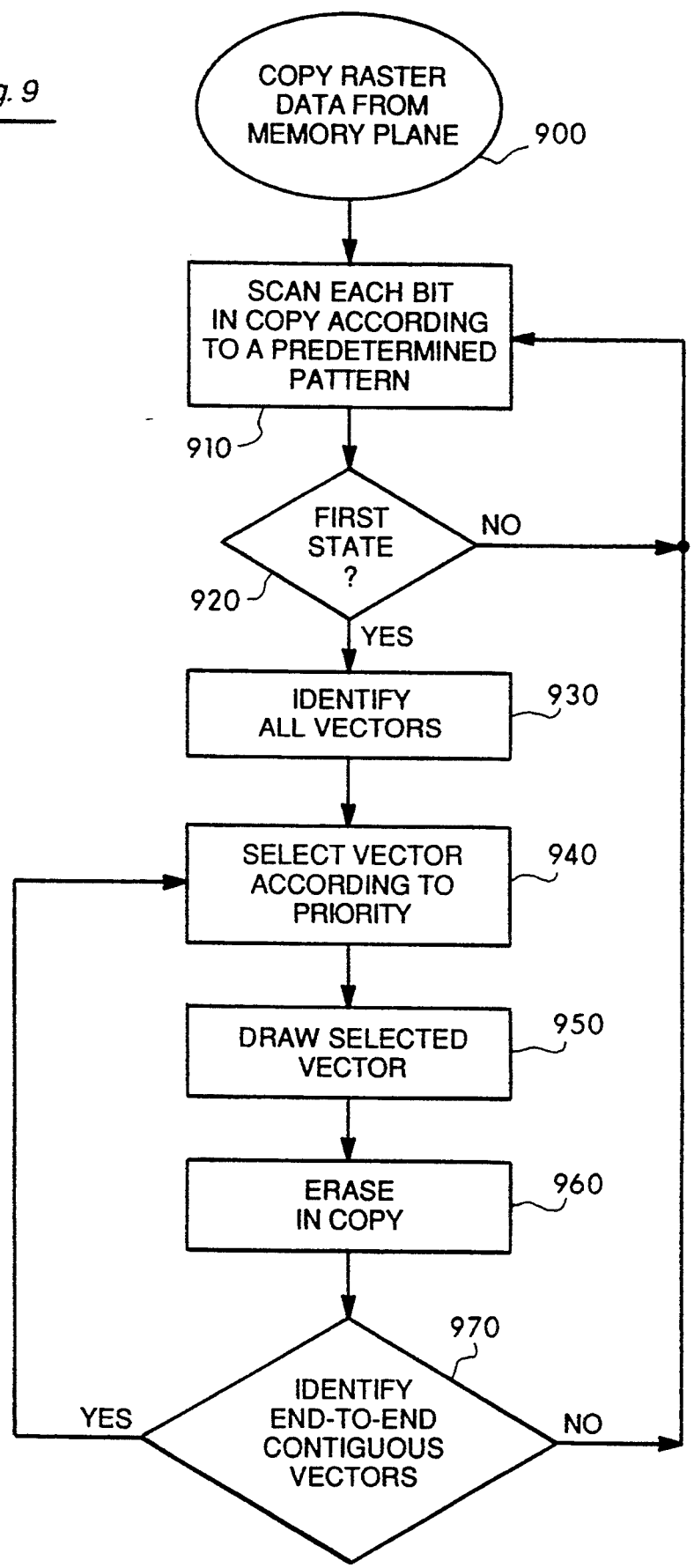
FIG. 9 is a flow chart of the operation of the present invention.

The plotting algorithm 210 of the present invention is set forth in FIG. 9.

In FIG. 9, the first stage of operation 900 is the copying of the raster data in the memory plane 120 into the scratch pad memory 200 in order to provide a working copy of the raster data. Then, in stage 910 each bit in the working copy is scanned according to a predetermined pattern. This predetermined pattern, as fully discussed previously, is a sequential bit-by-bit, row-by-row analysis commencing with the bit in one corner of the raster memory plane.

In stage 920, when the first state of a bit is sensed (i.e., corresponding to an illuminated pixel), then stage 930 is entered. If the second state is detected, then stage 910 is re-entered and the scan continues according to the predetermined pattern until a bit is discovered in the first state. In stage 930, when a first state is discovered for a bit, all of the vectors in the eight directions from that bit are identified. Once identified, state 940 is entered. Only one of the vectors will be selected according to a priority scheme.

In the present invention, the priority scheme gives precedence to horizontal and vertical vectors over diagonal vectors; between vectors of the same priority, the longest vector is selected. Again, this priority scheme has been fully discussed and illustrated above.

The selected vector is drawn in stage 950 by a vector plotter (or the selected vector is provided as vector output). In addition, the bits of the selected vector are erased from the working copy in stage 960. That is, all of the bits in the vector are set to the second state. There is no particular order between plotting the vector and erasing the vector in the scratch pad memory 200 and the invention is not to be limited in this respect.

Stage 970 is then entered to ascertain the existence of any end-to-end contiguous vectors from the ending point of the selected vector in stage 940. If there are other vectors identified, then stage 940 is re-entered and only one of those vectors is selected to be drawn in 950 and erased from memory in 960. This process continues until all end-to-end contiguous vectors existing in a series have been discovered and drawn and erased. In the event that no more end-to-end contiguous vectors are discovered, stage 910 is re-entered so as to fully evaluate each bit in the working copy.

It is to be expressly understood that the claimed invention is not to be limited to the description of the preferred embodiment but encompasses other modifications and alterations within the scope and spirit of the inventive concept.

I claim:

1. A method of converting raster X,Y bits in a memory plane to vector output in real time, a first state of each bit in the memory plane corresponding to a binary one and a second state of each bit corresponding to a binary zero, said method comprising the steps of:
    (a) copying the raster X,Y bits in the memory plane into a working copy so that the working copy contains all of the X,Y bits of the memory plane,
    (b) sequentially selecting and scanning a bit in the working copy according to a predetermined pattern in order to sense the presence of the first and second states as follows:
        (i) in response to the sensing of the second state for a given bit, moving to a next sequential bit in the predetermined pattern,
        (ii) in response to the sensing of the first state for the given bit identifying all vectors having beginning coordinates corresponding to the X,Y coordinate of the given selected bit,
    (c) in response to the identification of all vectors in step (b)(ii) having a beginning coordinate corresponding to the X,Y coordinate of the given selected bit, selecting one vector from said identified vectors according to a predetermined priority scheme,
    (d) outputting the beginning X,Y coordinate and an ending X,Y coordinate of the selected vector,
    (e) changing all of the bits of the selected vector determined by step (c) from the first state to the second state in the working copy,
    (f) identifying all vectors having bits in the first state having beginning X,Y coordinates corresponding to the ending coordinate of the selected vector determined by step (c), (g) in the event no vectors are identified in step (f), returning to step (b) so as to sequentially select and scan the next bit in the working copy according to the predetermined pattern, (h) in response to the identification of all vectors in step (f), repeating steps (c) through (h).

2. The method of claim 1 wherein said predetermined pattern comprises a sequential pattern with scanning commencing at a preselected bit in the working copy.

3. The method of claim 1 wherein said predetermined priority scheme comprises the steps of:
 (i) selecting horizontal and vertical vectors over diagonal vectors,
 (ii) selecting the longest vector in response to the selection in step (i),
 (iii) in the event the vectors are of equal length in step (ii), selecting horizontal vectors over vertical vectors.

4. The method of claim 1 wherein step (d) further comprises the step of:
 when the ending X,Y coordinate of the last vector identified in step (f) is within one X,Y coordinate of the beginning X,Y coordinate of the selected vector, then substituting the beginning X,Y coordinate of the selected vector for the ending X,Y coordinate of the last vector so as to close the loop in the vector output.

5. A method of converting raster data in a memory plane to vector output, the raster data having a bit for each pixel in a display, a first state of each bit corresponding to an illuminated pixel and a second state of each bit corresponding to an unilluminated pixel, said method comprising the steps of:
 (a) copying the raster data in the memory plane into a working copy so that the working copy contains all of the X,Y bits of the memory plane,
 (b) starting at a single predetermined bit in the working copy,
 (c) sequentially selecting and scanning a bit in the working copy to sense the presence of the first state and the second state,
 (d) in response to the sensing of the second state for a given scanned bit in step (c), moving to a next sequential bit and repeating step (c),
 (e) in response to the sensing of the first state in step (c) identifying all vectors having bits in the first state which have beginning coordinates corresponding to the given scanned bit,
 (f) in response to the identification of all vectors having beginning coordinates corresponding to the coordinates of the given scanned bit, selecting one vector according to a predetermined priority scheme,
 (g) outputting the beginning coordinate and an ending coordinate of the selected vector,
 (h) changing all of the bits of the selected vector from the first state to the second state in the working copy,
 (i) identifying all vectors having bits in the first state having beginning coordinates corresponding to the ending coordinates of the selected vector in step (f), and
 (j) in response to the identification of any vector in step (i), repeating steps (f) through (j), in the event no vectors are identified in step (i) repeating steps (c) through (j) so as to select and scan the next sequential bit in the working copy until all bits are sequentially scanned.

6. The method of claim 5 wherein said predetermined priority scheme comprising the steps of:
 (i) selecting horizontal and vertical vectors over diagonal vectors,
 (ii) selecting the longest vector in response to the selection in step (i),
 (iii) in the event the vectors are of equal length in step (ii), selecting horizontal vectors over vertical vectors.

7. The method of claim 6 wherein step (g) further comprises the steps of:
 when the ending X,Y coordinate of the last vector identified in step (i) is within one X,Y coordinate of the beginning X,Y coordinate of the selected vector, then substituting the beginning X,Y coordinate of the selected vector for the ending X,Y coordinate of the last vector so as to close the loop in the vector output.

8. A method of converting raster data in a memory plane to drive a vector plotter, the raster data having a bit for each pixel in a display, a first state of each bit corresponding to an illuminated pixel and a second state of each bit corresponding to an unilluminated pixel, said method comprising the steps of:
 (a) copying the raster data in the memory plane into a working copy so that the working copy contains all of the X,Y bits of the memory plane,
 (b) starting at a single predetermined bit in the working copy,
 (c) scanning an individual bit in the working copy to sense the presence of the first state and the second state,
 (d) in response to the sensing of the second state for a given scanned bit in step (c), identifying a next sequential bit in the working copy, moving to the next sequential bit, and repeating step (c),
 (e) in response to the sensing of the first state in step (c) identifying all vectors having beginning coordinates corresponding to the given scanned bit,
 (f) in response to the identification of all vectors in step (e), selecting one vector according to the following predetermined priority scheme:
  (i) selecting horizontal and vertical vectors over diagonal vectors,
  (ii) selecting the longest vector in response to the selection in step (i),
  (iii) in the event the vectors are of equal length in step (ii), selecting horizontal vectors over vertical vectors,
 (g) drawing the selected vector with the vector plotter,
 (h) changing all of the bits of the selected vector from the first state to the second state in the memory plane,
 (i) identifying all vectors having bits in the first state having beginning coordinates corresponding to the ending coordinates of the vector selected in step (f), and
 (j) in response to the identification of any vector in step (i), repeating steps (f) through (j); in response to the failure to identify any vectors in step (i), identifying the next sequential bit in the working copy and repeating steps (c) through (j).

9. The method of claim 8 wherein step (g) further comprises the steps of:

when the ending X,Y coordinate of the last vector identified in step (i) is within one X,Y coordinate of the beginning X,Y coordinate of the selected vector, then substituting the beginning X,Y coordinate of the selected vector for the ending X,Y coordinate of the last vector so as to draw a closed loop with the vector plotter.

10. A method of converting raster X,Y bits in a memory to vector output, a first state of each bit in the memory corresponding to a lit pixel and a second state of each bit corresponding to an unlit pixel, said method comprising the steps of:
  (a) selecting and scanning a bit in the memory according to a predetermined pattern in order to sense the presence of the first and second states as follows:
    (i) in response to the sensing of the second state for the scanned bit, moving to a next sequential bit in the predetermined pattern of scanning,
    (ii) in response to the sensing of the first state for the given scanned bit identifying all vectors having beginning coordinates corresponding to the X,Y coordinate of the given scanned bit,
  (b) in response to the identification of all vectors in step (a)(ii) having a beginning coordinate corresponding to the X,Y coordinate of the given scanned bit, selecting one vector according to a predetermined priority scheme,
  (c) outputting the beginning and ending X,Y coordinates of the selected vector,
  (d) changing all of the bits of the selected vector determined by step (b) from the first state to the second state in the memory,
  (e) identify all vectors having bits in the first state having beginning X,Y coordinates corresponding to the ending coordinate of the selected vector determined by step (b),
  (f) in the event no vectors are identified in step (e), returning to step (a) so as to select and scan the next sequential bit in the predetermined pattern, and
  (g) in response to the identification of all vectors in step (e), selecting one vector according to the predetermined priority scheme and repeating steps (c) through (g).

11. The method of claim 10 wherein step (c) further comprises the steps of:
  when the ending X,Y coordinate of the last vector identified in step (c) is within one X,Y coordinate of the beginning X,Y coordinate of the selected vector, then substituting the beginning X,Y coordinate of the selected vector for the ending X,Y coordinate of the last vector so as to close the loop in the vector output.

12. A method of converting raster X,Y bits in a memory to vector output, said method comprising the steps of:
  (a) selecting and scanning one bit in the memory according to a predetermined pattern in order to identify all vectors having beginning coordinates corresponding to the X,Y coordinate of the selected scanned bit,
  (b) in response to the identification of all vectors in step (a) having a beginning coordinate corresponding to the X,Y coordinate of the selected scanned bit, selecting one vector according to a predetermined priority scheme,
  (c) outputting the beginning X,Y coordinate and an ending X,Y coordinate of the selected vector,
  (d) erasing all of the bits of the selected vector determined by step (b) in the memory,
  (e) identifying all vectors having bits having beginning X,Y coordinates corresponding to the ending coordinate of the selected vector determined by step (b),
  (f) in the event no vectors are identified in step (e), returning to step (a) so as to select and scan one next sequential bit in the predetermined pattern,
  (g) in response to the identification of all vectors in step (e), selecting one vector according to the predetermined priority scheme repeating steps (c) through (g).

13. The method of claim 12 wherein step (c) further comprises the steps of:
  when the ending X,Y coordinate of the last vector identified in step (c) is within one X,Y coordinate of the beginning X,Y coordinate of the selected vector, then substituting the beginning X,Y coordinate of the selected vector for the ending X,Y coordinate of the last vector so as to close the loop in the vector output.

14. A system of converting raster bits in a raster memory plane to vector output in real time, a first state of each bit in the memory plane corresponding to an illuminated pixel and a second state of each bit corresponding to an unilluminated pixel, said system comprising:
  means connected to said raster memory plane for storing a copy of said raster bits so that said copy contains all of said bits in the memory plane,
  means connected to said storing means and to said vector output for sequentially scanning each copied bit individually in said storing means according to a predetermined pattern in order to sense the presence of said first and second states,
  when said second state for a given bit is sensed, said scanning means scanning a next bit in said predetermined pattern;
  when said first state for the given bit is sensed, said scanning means identifying all vectors in said storing means having beginning coordinates corresponding to the X,Y coordinate of the given scanned bit;
  when said scanning means identifies more than one vector, said scanning means selecting one vector according to a predetermined priority scheme, identifying all end-to-end contiguous vectors to said selected vector and outputting the beginning and ending X,Y coordinates of the selected vector and all end-to-end contiguous vectors;
  said scanning means changing all of the bits of the selected vector and all end-to-end contiguous vectors from the first state to the second state in said storing means.

15. A system of converting raster bits in a raster memory plane to vector output in real time, said system comprising:
  means connected to said raster memory plane for storing a copy of said raster bits so that said copy contains all of said bits in the memory plane,
  means connected to said storing means and to said vector output for identifying at a selected one bit of said copied bits in said storing means, a vector having its beginning X,Y coordinates at the aforesaid selected bit and to identify all end-to-end contiguous vectors to said identified vector, said identifying means erasing all of the bits of said identified vector and of all of said end-to-end contiguous vectors in said storing means before identifying a next vector and all end-to-end contiguous vectors to said next vector at a next sequentially selected one bit of said copied bits in said storing means.

* * * * *